Jan. 24, 1956  H. H. STROZIER  2,732,524
SHUNT CAPACITOR ARRANGEMENT
Filed April 21, 1955  3 Sheets—Sheet 3

Inventor
Henry H. Strozier,
by Gilbert P. Tarleton
His Attorney.

United States Patent Office 2,732,524
Patented Jan. 24, 1956

2,732,524

SHUNT CAPACITOR ARRANGEMENT

Henry H. Strozier, Atlanta, Ga., assignor to General Electric Company, a corporation of New York Application April 21, 1955, Serial No. 502,801

5 Claims. (Cl. 323—128)

The present invention relates to electric circuits and more particularly to an improved switching arrangement for a shunt capacitor circuit.

It is an object of the invention to provide an improved circuit arrangement for switching of shunt capacitors.

It is another object of the invention to provide an improved shunt capacitor circuit which provides greater economy in the number and type of switching devices employed for connecting shunt capacitor banks into a three-phase power circuit.

It is a further object of the invention to provide a capacitor bank arrangement which is easily assembled, operated and maintained.

In accordance with the invention, there is provided a three-phase shunt capacitor arrangement for connection across and disconnection from a three-phase power circuit, the arrangement comprising in its broad aspects three equal reactance groups of capacitors each having a connection to a different line of the three-phase power circuit and a neutral terminal, an ungrounded neutral bus, connecting means between the neutral terminals of all of the groups of capacitors and the neutral bus, the connecting means including a plurality of switching devices at least two of which are arranged respectively between two neutral terminals and the neutral bus, whereby the switching devices are protected from overload conditions in the line by the capacitors and whereby closing of the two switching devices will apply the voltage to neutral of each line of the power circuit to a different group of capacitors and opening of the two switching devices will interrupt flow of current in all three groups of capacitors.

The invention will be better understood from the following description taken in conjunction with the accompanying drawings in which:

Fig. 3 is a plan view of the capacitor bank taken along the line A—A in Fig. 2.

Figure 1:
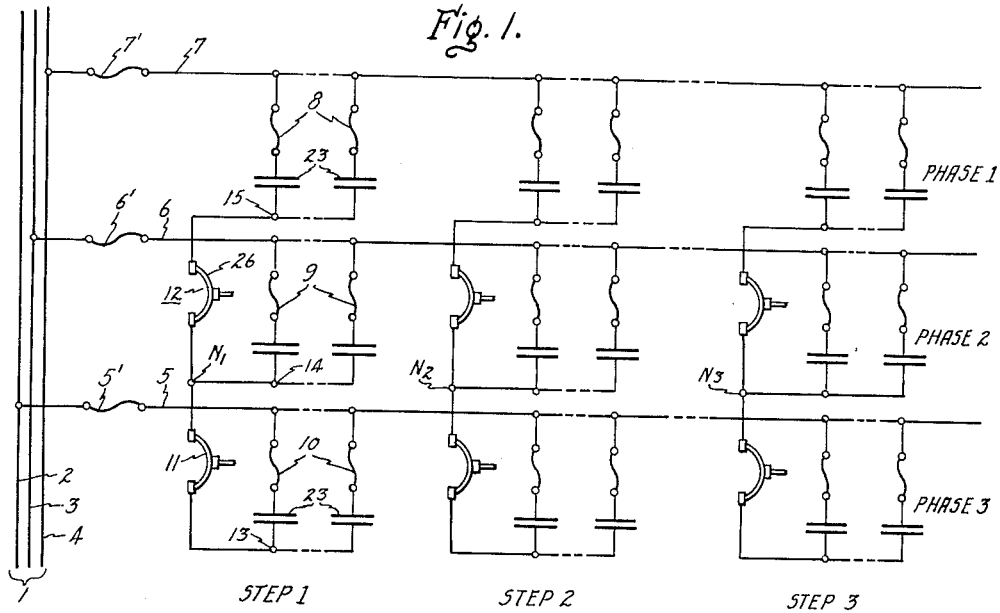
Fig. 1 is a circuit diagram illustrating the switching arrangement in accordance with the invention.

Referring now to the drawings, and particularly to Fig. 1, there is shown a wiring diagram of a shunt connected capacitor circuit embodying the present invention. The diagram shows a main three-phase power circuit 1 which comprises three line conductors 2, 3, and 4 which are connected to any suitable source of balanced three-phase voltage (not shown). Connected to the respective line conductors by means of fuses 5', 6', and 7' are line buses 5, 6, and 7, to which are connected a capacitor bank composed of three phase groups, each divided into three steps. The number of steps may, of course, be varied as desired. The phase group in each step is star-connected to form a floating, i. e., ungrounded, neutral bus as indicated by $N_1$, $N_2$ and $N_3$ of the respective steps. A group of capacitors is connected between each phase line bus and the neutral bus in each step, with fuses 8, 9 and 10 being arranged on the line side of each capacitor group. While only two capacitors are shown connected in parallel in each group in the respective steps, it will be understood that as many capacitors as desired or necessary may be employed therein.

Between the neutral bus and the neutral terminals 13 and 15 of the capacitor groups of two of the three phases in each step there are arranged switching devices 11 and 12, the neutral terminal 14 of the remaining phase group in each step being directly and permanently connected to the neutral bus. In this way, switching of the capacitor groups is done on the neutral side, rather than on the line side, of the capacitor groups. Also, by virtue of the arrangement described, in order to connect or disconnect any step of the capacitor bank in shunt across the three phase power circuit, it is necessary to close or open only the two switches of the step concerned, and the capacitor groups for all three phases will be accordingly connected into or disconnected from the power circuit.

Figure 2:
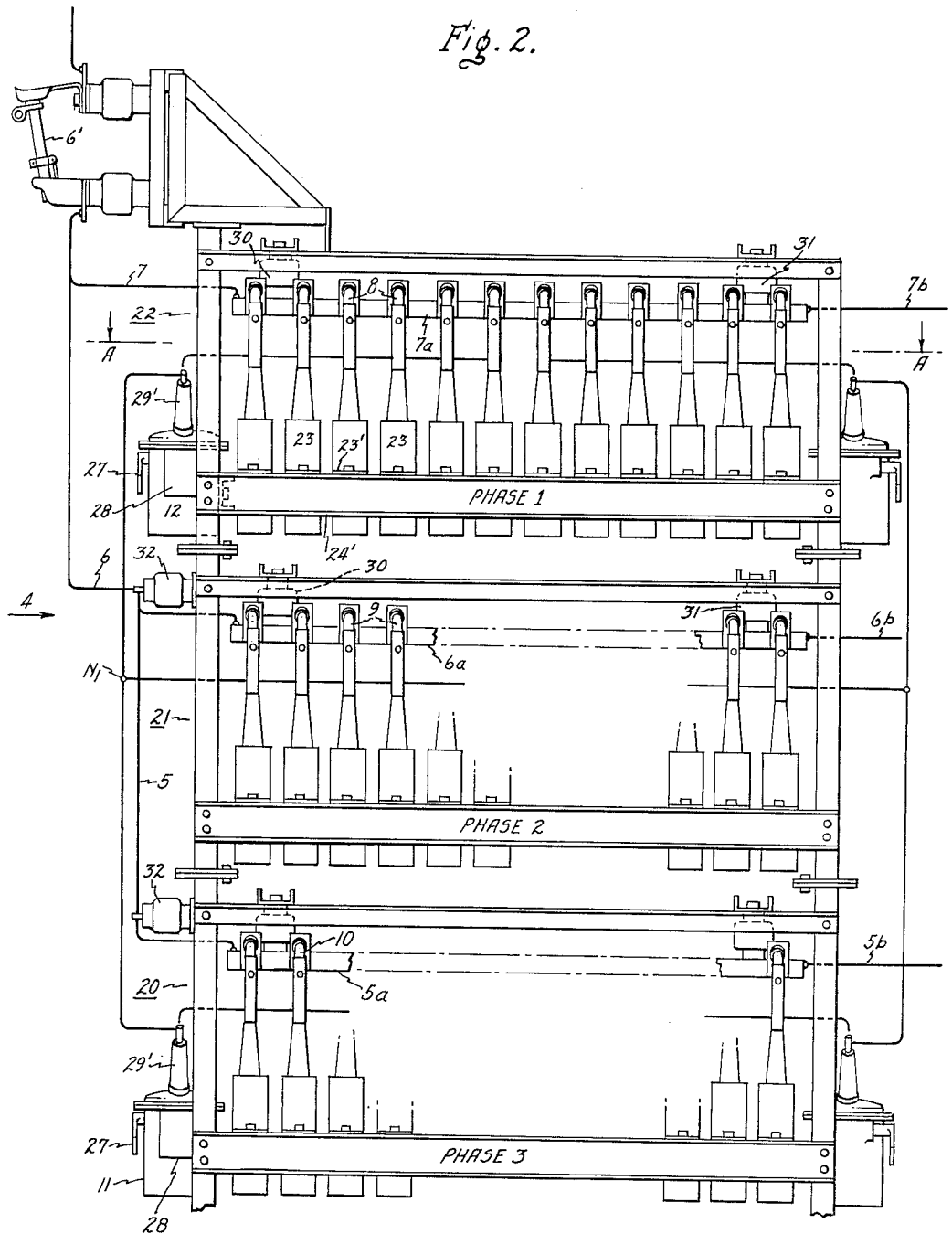
Fig. 2 is a side elevation of a capacitor bank and its component parts arranged in accordance with the invention.
Figure 4:
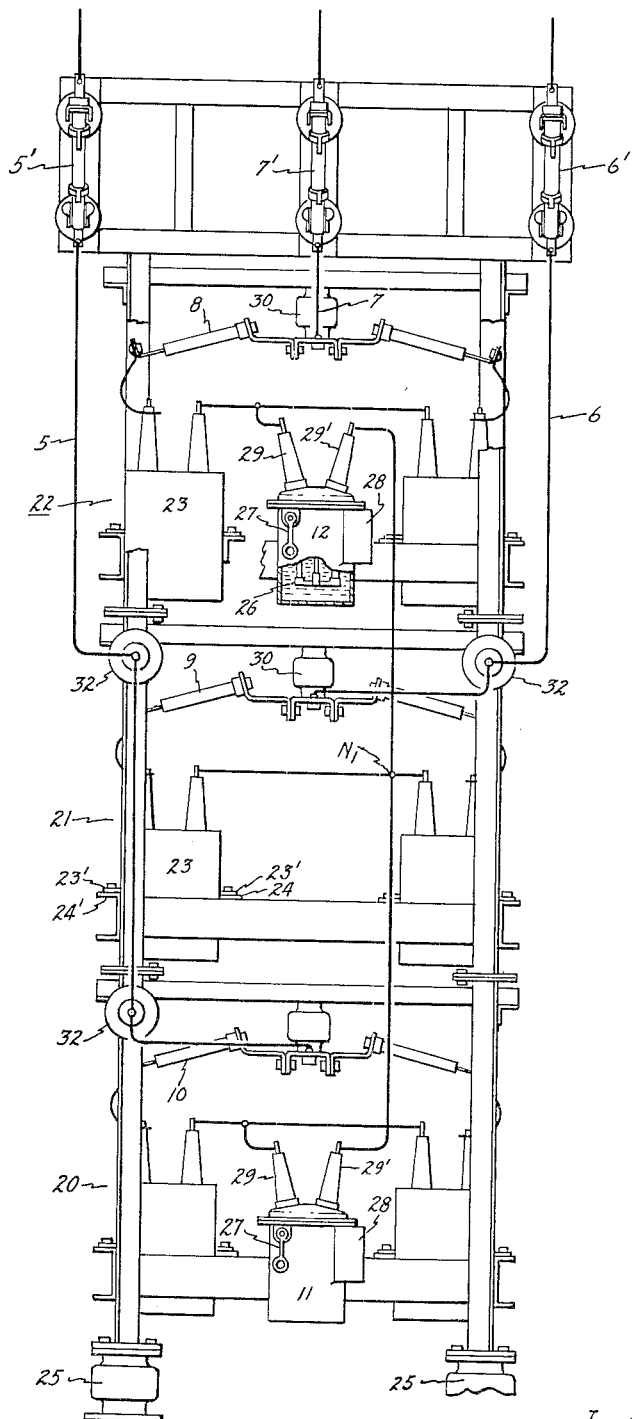
Fig. 4 is an end elevation taken in the direction of arrow 4 in Fig. 2.

Figs. 2, 3, and 4 illustrate an embodiment of a capacitor bank arranged in accordance with the invention, and as shown the capacitor bank is made up of standard stacking rack units. The first two steps are made up of three rack units 20, 21, and 22 with each stacking unit or rack holding 24 capacitors, and the third or additional steps (not shown in Figs. 2 and 3) comprising the same number of stacking units each having the same or a different number of capacitors. As shown in Figs. 2, each stacking unit level comprises one phase group, while the different steps are spaced horizontally. The individual capacitors 23 are mounted by means of flanges 23' projecting laterally from their cases and bolted to the cross beams 24, 24' of the stacking frames, in accordance with well known practice. Protection to the capacitor bank from overcurrent conditions is provided by three power fuses 5', 6' and 7' or other suitable protective means mounted on the top rack (see Fig. 4) and connected between the main power circuit 1 and the individual line buses 5, 6, and 7. Line buses 5 and 6 leading from the power fuses to their respective rack levels are held on the stacking units by means of insulators 32, as shown in Fig. 2. Within the stacking racks the line buses are constituted by bus bars 5a, 6a, 7a (see Fig. 2) which are mounted on the top rack (see Fig. 4) and connected to additional steps in other stacking units (not shown) by leads 5b, 6b, and 7b. The line buses through the racks for each phase level are continuous and energized whenever the main fuses 5', 6', and 7' are closed, all the capacitors in each phase being connected to the bus bars through fuses 8, 9, and 10. In order to avoid grounding of the neutral buses through accidental contact with the rack frames, insulators 25 are provided at the foot at the lowest rack frame (Fig. 4).

Fig. 4 shows the location of the two switching devices 11 and 12 for the first step at the end of the stacking rack, and arrangement which affords ready access to the switches for operation and maintenance. Location of the switches on the neutral side of the capacitor groups, rather than on the line side as in the usual practice, provides current limitation protection for the switching device due to the capacitor impedance for any fault that should occur not only on the neutral side but also on the capacitor side of the capacitor switch. This permits the use of an inexpensive type of switching device or circuit breaker for connecting and disconnecting the capacitor bank into and out of the main power circuit.

The switching devices 11 and 12 shown in the drawing may therefore be of a relatively simple construction and without any provision for overload protection if so desired. In the particular type shown which is of conventional construction, the switch comprises a vertically movable contact 26 operable in known manner either by manual lever 27 or electrical actuating means 28 of known type for connecting the terminals leading from the respective bushings 29, 29'.

As shown in Fig. 4, the neutral terminals of the capacitors in the upper and lower stacking levels are connected through the switches 11 and 12, respectively, to neutral bus $N_1$ while the capacitors of the intermediate level are directly connected to $N_1$, the same relative arrangement prevailing on the opposite side of the stacked racks with respect to step 2.

While in the embodiment shown a direct connection is provided between the neutral terminal of the capacitor group of phase 2 and the neutral bus, it will be understood that a third switching device or circuit breaker could be provided at that point, if desired, to serve, for example, as a standby switch which could be used if one of the other switches failed to operate. Further, instead of using separate single-pole switches, all the switches may be combined into a single unit as a two- or three-pole switch which may be employed to connect the entire capacitor bank into the power circuit in the manner described.

The arrangement disclosed allows any combination of capacitor bank steps to be connected in shunt with the power circuit to achieve the desired results in power factor correction or voltage control. Considerable economy is made possible in the use of relatively inexpensive types of switches or circuit breakers permitted by the neutral switching arrangement and by the use of only two switches to control all three phases. Moreover, the invention provides for a simple bus arrangement which can be readily employed with standard open type stacking racks such as those illustrated in the drawing, which lends itself for application to capacitor banks of any number of capacitors and which allows easy access to the switching devices and other parts with a minimum of risk maintenance and operation.

While the present invention has been described with reference to particular embodiments thereof, it will be understood that modifications may be made by those skilled in the art without actually departing from the scope of the invention. Therefore, the appended claims are intended to cover all such equivalent variations as come within the true spirit and scope of the foregoing disclosure.

What I claim as new and desire to secure by Letters Patent of the United States is:

1. A three-phase shunt capacitor arrangement selective for connection across a three-phase power circuit and removal therefrom comprising, in combination, three equal reactance groups of capacitors each having a connection to a different line of said three phase power circuit and a neutral terminal, an ungrounded neutral bus, connecting means between the neutral terminals of all of said groups of capacitors and said neutral bus, said connecting means including switching means arranged between at least two neutral terminals and said neutral bus, and means for closing and opening said switching means, whereby said switching means are protected from overload conditions in the line by said capacitors and whereby closing of said switching means will apply the voltage to neutral of each line of said circuit to a different group of capacitors and opening of said switching means will interrupt all flow of current in all three groups of capacitors.

2. A three-phase shunt capacitor arrangement selective for connection across a three-phase power circuit and removal therefrom comprising, in combination, three equal reactance groups of capacitors each having a connection to a different line of said three phase power circuit and a neutral terminal, an ungrounded neutral bus, connecting means between the neutral terminals of all of said groups of capacitors and said neutral bus, said connecting means including a plurality of switching devices at least two of which are arranged respectively between two neutral terminals and said neutral bus, and means for closing and opening said switching devices, whereby said switching devices are protected from overload conditions in the line by said capacitors and whereby closing of said two switching devices will apply the voltage to neutral of each line of said circuit to a different group of capacitors and opening of said two switching devices will interrupt all flow of current in all three groups of capacitors.

3. A three-phase shunt capacitor arrangement selective for connection across a three-phase power circuit and removal therefrom comprising, in combination, a plurality of capacitors divided into parallel-connected steps each composed of three groups of substantially equal reactance, each group in the respective steps having a connection to a different line of said three phase power circuit and a neutral terminal, an ungrounded neutral bus for each step, a direct connection between one neutral terminal and the neutral bus in each step, a pair of switching devices connected respectively between the remaining two neutral terminals and said neutral bus, and means for closing and opening both switching devices, whereby said switching devices are protected from overload conditions in the line by said capacitors and whereby closing of both switching devices will apply the voltage to neutral of each line of said circuit to a different group of capacitors in the respective steps and opening of both switching devices will interrupt all flow of current in all three groups of capacitors in the respective steps.

4. A three-phase shunt capacitor bank arrangement selective for connection across a three-phase power circuit and removal therefrom comprising, in combination, three supporting racks, three equal reactance groups of capacitors each having a connection to a different line of said three phase power circuit and a neutral terminal, each group being mounted in a different supporting rack, an ungrounded neutral bus, a direct connection between one neutral terminal and said neutral bus, a pair of switching devices connected respectively between the remaining two neutral terminals and said neutral bus, and means for closing and opening both switching devices, whereby said switching devices are protected from overload conditions in the line by said capacitors and whereby closing of both switching devices will apply the voltage to neutral of each line of said circuit to a different group of capacitors and opening of both switching devices will interrupt all flow of current in all three groups of capacitors.

5. A three-phase shunt capacitor bank arrangement selective for connection across a three-phase power circuit and removal therefrom comprising, in combination, three vertically stacked elongated supporting racks, three equal reactance groups of capacitors each having a connection to a different line of said three phase power circuit and a neutral terminal, each group being mounted in a different supporting rack, an ungrounded neutral bus, a direct connection between one neutral terminal and said neutral bus, a pair of switching devices mounted on the ends of two of said supporting racks and connected respectively between the remaining two neutral terminals and said neutral bus, and means for closing and opening said switching devices, whereby said switching devices are protected from overload conditions in the line by said capacitors and whereby closing of both switching devices will apply the voltage to neutral of each line of said circuit to a different group of capacitors and opening of both switching devices will interrupt all flow in all three groups of capacitors.

No references cited.